Oct. 17, 1933.  L. S. HARVEY ET AL  1,931,001
PROCESS AND APPARATUS FOR PRODUCING CONTINUOUS ZINC WIRE
Filed March 21, 1931
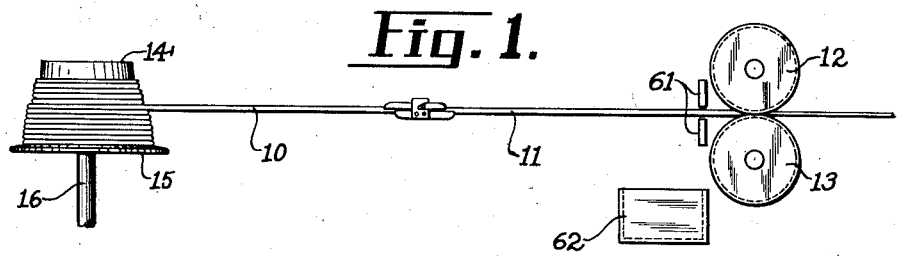
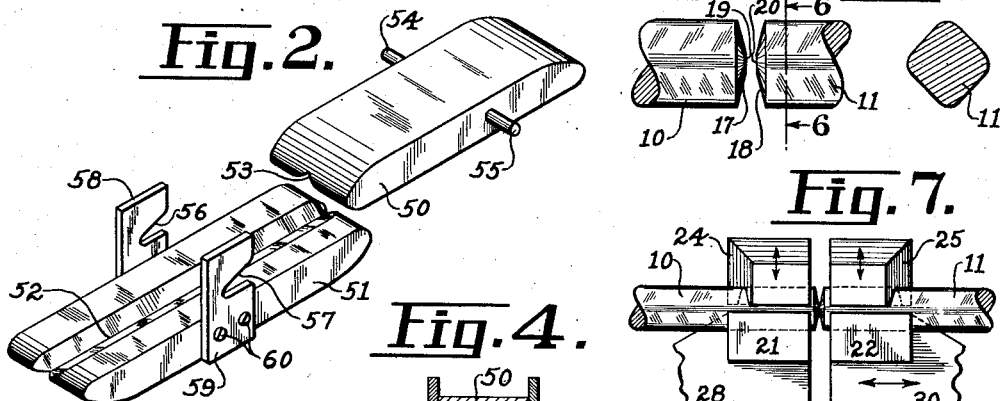
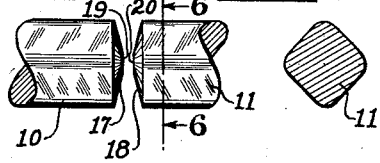
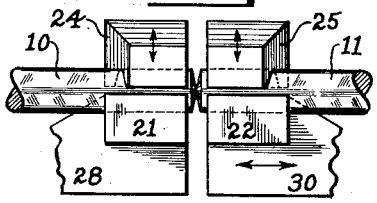
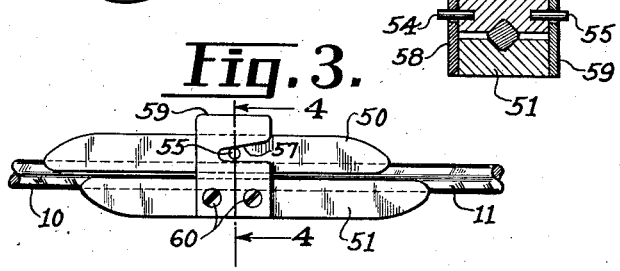
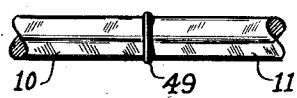
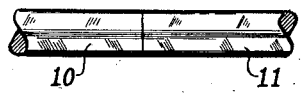
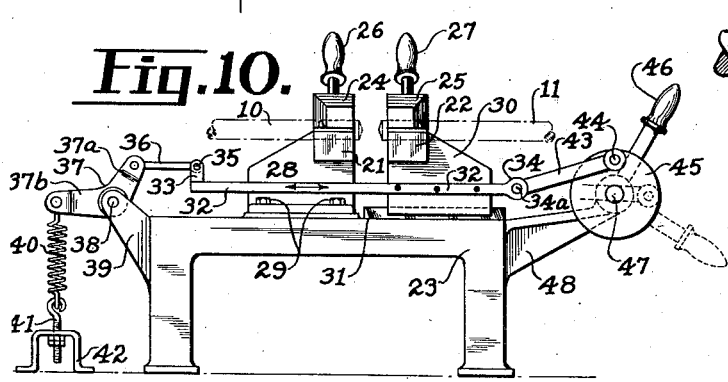
Inventors
Leaman S. Harvey.
Howard P. Hart.
By their Attorney
H. G. Manning Patented Oct. 17, 1933

1,931,001

UNITED STATES PATENT OFFICE 1,931,001

PROCESS AND APPARATUS FOR PRODUCING CONTINUOUS ZINC WIRE

Leaman S. Harvey and Howard P. Hart, Waterbury, Conn., assignors to Platt Bros. & Company, Waterbury, Conn., a corporation of Connecticut Application March 21, 1931. Serial No. 524,332

20 Claims. (Cl. 205—21)

This invention relates to wire drawing, and more particularly to a method and apparatus for producing a wire of zinc of unlimited length from a plurality of short sections united by metallic cohesion and worked in such a manner as to have a substantially uniform tensile strength throughout its length.

One object of the present invention is to produce a coil of zinc wire with a single threading of the wiredrawing apparatus of considerably greater length than was formerly possible.

A further object is to produce a process and apparatus for welding together the ends of a pair of zinc wire coils and clamping the welded joint while the coils are being unwound from a drum to prevent said joint from breaking before being passed through reducing rolls and dies.

A further object is to provide a process of shaping the ends of the zinc wire coils prior to welding in such a manner as to produce a strong welded joint which, after being suitably reinforced by clamping means, may be passed through any number of successive rolls and dies without breaking.

A further object is to provide a novel method of uniting metallic members by butt-welding the ends of said members by the use of an electric welding current caused to flow through said members, which consists in causing the electric current to initially fuse a small central area of abutment and to thereafter progressively expand the area of fusion to the full area of the desired weld.

A further object is to provide an improved form of clamp adapted to hold the welded joint during the preliminary unwinding of the wire coil, said clamp comprising a pair of overlapping wire-engaging jaws which will be automatically disengaged from the wire joint by means of a stop bar located in front of the first set of reducing rolls.

A further object is to provide an apparatus of the above nature, which will be simple in construction, inexpensive to manufacture, easy to manipulate, compact, and very efficient and durable in use.

With these and other objects in view there has been illustrated on the accompanying drawing one form in which the invention may be conveniently embodied in practice.

In the drawing:

Fig. 1 represents a diagrammatic view of a portion of the apparatus showing the end of one coil of wire being drawn from a conical drum and the attached end of another coil being passed through a pair of reducing rolls, the joint between two adjacent coils being reinforced by a clamping member.

Fig. 2 is a perspective view in separated relation of the two jaws of the clamping member.

Fig. 3 is a front elevation of the clamping jaws assembled in operating position about the welded joint between the ends of a pair of zinc wire coils.

Fig. 4 is a vertical sectional view of the same, taken along the line 4—4 of Fig. 3, looking in the direction of the arrows.

Fig. 5 is a fragmentary front view, on an enlarged scale, of the adjacent ends of two zinc wire coils preparatory to forming a welded joint therebetween.

Fig. 6 is a cross-sectional view of one of the wire coils, taken along the line 6—6 of Fig. 5.

Fig. 7 is a fragmentary front view of the gripping jaws of a welding machine showing the extremities of two adjacent wires in welding position.

Fig. 8 is a fragmentary view of the welded joint between two adjacent wires as it appears immediately after welding.

Fig. 9 is a similar view of the welded joint after the extruded fin has been removed therefrom.

Fig. 10 is a front view on a reduced scale of a machine for welding the ends of a pair of zinc wire coils together, the electrodes being shown in an intermediate position.

Zinc wire is ordinarily made from high grade zinc billets, in which the zinc is in the form of relatively large crystals and, as a consequence, is readily fracturable, and of low tensile strength. In the production of small zinc wires, the billets are first rolled into relatively large wires and wound in coils which subsequently are drawn down to the desired cross-sectional area. The length of the wires, however, which can be thus produced has previously been dependent upon the size of the billet, which had to be relatively small in order to be conveniently handled.

It has heretofore been impossible to unite the ends of the wire coils drawn from the billets by welding for the reason that the fusion of the ends of the wires restored the original crystalline structure and produced a joint of a very low tensile strength, which was easily broken during the straightening of the wire as it was drawn from the coil. Consequently, it has been customary up to the time of the present invention to pass each coil of wire separately through the reducing rolls and dies, resulting in a relatively high labor cost due to the fact that it was necessary to pass the leading end of each separate coil into the rolls and dies of the wiredrawing apparatus.

By means of the present invention, the above and other disadvantages have been avoided, and two or more coils may be welded together to produce a wire of unlimited length, capable of being passed as a single unit through the wiredrawing apparatus without breaking apart at the joints between said coils, thus eliminating the labor of separately handling said coils. Briefly, the present method comprises uniting by fusion the abutting ends of successive sections of the relatively large wire coils, reinforcing the joints thus produced, and progressively rolling and drawing the united coils to produce a smaller cross-sectional area, the reinforcement being automatically removed immediately before said joints reach the reducing apparatus. The ends of the wire coils are united by first tapering said ends in such a manner as to produce a relatively small initial area of abutting contact. When the current is turned on, the metal at the abutting area of contact will fuse and, as said ends are pressed toward each other, preferably with progressively decreasing pressure, the fusion area will gradually expand to the full diameter of the desired weld.

Any suitable means may be employed for working the metal of the joints and adjacent portions of the wires in which the normal weak crystalline structure of the zinc has been more or less reestablished by the welding heat. Preferably, this is accomplished by reducing rolls, the action of which produces the required temperature and condensation necessary to break down the large crystals of the previously-heated portions, and cause the joints to assume substantially the same tensile strength as the remainder of the wire.

Referring now to the drawing in which like reference numerals denote corresponding parts throughout the several views, the numerals 10 and 11 indicate respectively the adjacent ends of a pair of coils of zinc wire, preferably substantially square in cross-section, as shown in Fig. 6. The wire 11 is shown in Fig. 1 as entering a pair of reducing rolls 12 and 13, and the wire 10 as being pulled from a conical drum 14 having a bottom flange 15 and mounted to rotate upon a vertical shaft 16.

In order to prepare the ends of the wire coils 10 and 11 for welding them together, the extremities of said ends are reamed to produce conical sections 17 and 18 having alined flat truncated portions 19 and 20 which are adapted to be brought into contact with each other when placed within the lower jaws 21 and 22 of the electrodes of a welding machine 23. The angle of the reamed conical sections with respect to the axis of the wire is preferably made about 87 degrees, and the diameter of said truncated portions is preferably about $\frac{1}{16}$ of an inch (where a wire $\frac{1}{4}$ of an inch square is employed.)

The lower jaws 21 and 22 are adapted to cooperate with a pair of upper movable clamping jaws 24 and 25 provided with rearwardly extending handles 26 and 27. The lower jaw 21 is rigidly mounted on a stationary section 28 of the welding machine, being attached to the base thereof, as by bolts 29. The lower jaw 22 is rigidly secured to a slidable carriage 30 resting upon a pair of guiding ribs 31 upstanding from the machine base 23.

The movable carriage 30 is provided on its front and rear sides with a pair of elongated parallel strips 32 having their ends secured respectively to a pair of cross members 33 and 34. The cross member 33 is connected by a pin 35 to a link 36 joined at its other end to a bell-crank lever 37 having a short inclined arm 37a and a longer horizontal arm 37b. The bell-crank lever 37 is pivoted at 38 to an inclined bracket 39 mounted on the machine base 23. The long arm 37b of the bell-crank lever 37 is connected to a depending coiled tension spring 40 adjustably secured at its lower end, as by an eye screw 41, to a U-shaped floor bracket 42.

The cross bar 34 is secured, as by a pin 34a, to a pitman rod 43 having its outer end connected, as by a pin 44, to a disc wheel 45 having a manually operated handle 46 extending radially therefrom. The disc wheel 45 is pivoted upon a shaft 47 mounted on an inclined bracket 48 secured to the base of the machine 23.

*Operation of welding machine*

In operation, when it is desired to weld the joint between the adjacent ends 10 and 11 of the two zinc wire coils, the handles 26 and 27 of the upper jaws 24 and 25 will first be raised to permit the wire ends 10 and 11 to be placed horizontally within the opposed V-shaped grooves in the lower jaws 21 and 22 of the electrodes. The upper jaws 24 and 25 will then be lowered by means of the handles 26 and 27 to the positions shown in Fig. 10. The operator will then rotate the handle 46 in a counter-clockwise direction away from the dead-end locked position, shown in dotted lines in Fig. 10 until the wire ends come into contact as shown in Fig. 7. The coiled spring 40 will then come into action and will exert a pulling force through the bell-crank lever 37, the link 36 and the strips 32 to cause the movable end 11 of the zinc wire to press with considerable force against the stationary end 10. The current will then be allowed to flow through the electrodes by means of a suitable switch, not shown, until the metal reaches the fusion point, whereupon the movable carriage 30 will automatically slide to the left on the guide ribs 31 a short distance toward the stationary carriage 28, causing the metal at the flat conical extremities of said wires to unite and weld said coils together. An annular fin of metal 49, as shown in Fig. 8, will at this time be extruded out of the welded joint. The current will then be automatically shut off by any suitable switch means, not shown.

During the movement of the wire 11 toward the wire 10 in the welding process, the tension in the spring 40, as will be clearly understood, will diminish due to the shortening of the length of said spring 40, so that the pressure upon the welded joint will be considerably reduced. With previous wire welding machines employing weights, this desirable tension-diminishing action was not obtained.

By means of the above described method of welding oxidization of the metal at the joint is reduced to the minimum and a homogeneous weld is produced which, when worked in the manner hereinafter described, will impart to the joint substantially the same tensile strength as that of the remainder of the wire.

*Reinforcing clamp*

After the welded joint has been allowed to cool until completely solidified, the ends 10 and 11 of the coils will be removed from the machine, the extruded fin filed off, and said welded joint will be reinforced by a two-part clamp consisting of a pair of cooperating over-lapping upper and lower jaws 50 and 51 having rounded ends. The lower jaw 51 is provided in its upper face with a V-shaped central groove 52, and the upper jaw 50 has a similar groove 53 on its under face, whereby the rectangular-shaped wire ends 10 and 11 will fit snugly within said grooves and be positively held against relative twisting. The upper jaw 50 has a pair of oppositely extending pins 54 and 55 protruding from its sides, and said pins are adapted to be received within a pair of wedge-shaped slots 56 and 57 formed in a pair of flat upstanding lug plates 58 and 59 secured, as by screws 60, to the sides of said lower jaw 51.

In assembling the jaws 50 and 51 about the welded joint, they will first be arranged in the position shown in Fig. 2, above and below the wires 10 and 11 respectively. The upper jaw 50 will then be moved to the left until the pins 54 and 55 are tightly locked within the wedge-shaped slots 56 and 57, as clearly shown in Fig. 3. The left-hand extremity of the upper jaw 50 will then protrude for some distance beyond the left-hand extremity of the lower jaw, and the right-hand extremity of the lower jaw will similarly protrude beyond the right end extremity of the upper jaw.

Hence, whenever the reinforced welded joint approaches the rolls 12 and 13, the protruding end of the lower jaw 51 or the upper jaw 50, as the case may be, will strike an abutment comprising an apertured stop bar 61 arranged in front of the opening between said rolls 12 and 13. The clamping jaws 50 and 51 will then be disengaged from each other, whereupon they will both fall away from the welded joint and drop into a receiving box 62 located below the stop bar 61. The welded joint will then be permitted to pass through the rolls 12 and 13, and through any other subsequent rolls and dies desired, whereby the tensile strength of the metal at the joint will be made substantially equal to that of the remainder of the wire.

By means of the present invention, the welded joint between the zinc wires 10 and 11 will be reinforced against breaking strains and stresses during the straightening out of the coil while the wire is being drawn from the vertical drum 13 to the roll 14. After the wire has been straightened, there is no further need for reinforcement, and the wire may be drawn down to any reduced size desired.

In practice, it has been found preferable to pass the wire first through three reducing rolls to render the welded joint sufficiently ductile to withstand the greater strains to which it is subjected in passing through the final drawing dies. After the final drawing operation, it is difficult to find the joint, as the weld to all intents and purposes then forms an integral part of the wire.

In some cases it has been found desirable to uncoil the wire with the welded joint in a heated condition. In fact, under these circumstances the clamping jaws may be removed if desired.

It will be understood that while the present invention is especially adapted for use on wire coils, it may also be employed on rods, tubes, strips and other shapes of metal within the spirit and scope of the invention. It may also be employed in some cases on metals other than zinc.

It will also be understood that the abutting ends of the wire coils may be united by other methods than electric welding to produce a joint having a high degree of metallic cohesion, such as by brazing.

One advantage of the present invention is that no matter which way the clamping jaws are placed in position, one of the jaws will be closer to the rolls than the other, and said jaws will positively separate from the welded joint when the latter reaches the cross bar 61.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. An apparatus for producing a continuous wire of unlimited length from initially separate sections of said wire, said wire being of a material the tensile strength of which is materially weakened after subjection to a welding temperature, which comprises means for uniting said sections by butt-welding, releasable means attached to said wire for reinforcing the joints, means to feed and to reduce the wire by working to a smaller cross-sectional area, and means for removing said reinforcing means from said joints as the joint approaches close to said reducing means.

2. An apparatus for producing a continuous zinc wire of unlimited length from initially separated sections thereof, which comprises reducing rolls operable to feed and to reduce the wire by working to a smaller cross sectional area, means for butt-welding the ends of said wire in advance of said reducing rolls, clamping means for engaging the adjacent end portions of the butt-welded joints and attached to said joints, and means for releasing said clamping means when the joints have been drawn into proximity to said drawing rolls.

3. In an apparatus for reducing the size of a plurality of welded metal pieces as a unit, means for reducing the size of said metal pieces, means detachably connected to said unit for preventing said welded joint from flexing between the time it leaves the welding means and enters said reducing means, and means for releasing said flexing-preventing means just before said joint enters said reducing means.

4. In an apparatus for producing a continuous wire of metal, the strength of which is materially weakened after subjection to a temperature sufficient to produce metallic cohesion, means for uniting by fusion of the metal the ends of sections of said wire, means for progressively reducing the continuous wire by working to produce a wire of smaller cross-sectional area, and means for maintaining a detachable separate connection of the end portions of the sections thus united until the same are subjected to sufficient working as will impart to the previously heated portions of said sections and the joint thereof the same tensile strength as the normal tensile strength of the wire.

5. In an apparatus for producing a continuous wire from a metal, the tensile strength of which is materially weakened after subjection to a welding temperature, means for butt-welding the ends of sections of said wire, means for progressively feeding and working the continuous wire to produce a wire of smaller cross-sectional area, and means for maintaining a detachable separate rigid connection between the end portions of said sections thus butt-welded until the same are subjected to such working and condensation as will impart to the previously heated portions of said sections and the joint thereof the same tensile strength as the normal tensile strength of the wire.

6. In an apparatus for producing a continuous zinc wire, means for uniting by fusion the abutting ends of a pair of successive sections of said wire, means for releasably reinforcing the joint thus produced by a device attached to said joint, means for progressively feeding and working the continuous wire to produce a wire of smaller cross-sectional area and to permit such condensation of the metal of the joint and portions of the wire adjacent thereto as to increase the tensile strength thereof substantially to the normal tensil strength of the wire, and means for removing the reinforcement immediately before the working of the joint.

7. In an apparatus for producing a continuous zinc wire from a pair of zinc wire coils as a unit with but one pass through a wire-reduction apparatus, means for welding the ends of said coils together, means for reinforcing the welded joint by a device attached to said joint to protect it from breaking stresses and strains while the ends of the coils are being straightened, means passing for said coils through the wire-reduction apparatus, and means for releasing said reinforcing means just before said joint enters said wire-reduction apparatus.

8. In an apparatus for reducing the size of a pair of metal pieces as a unit, means for welding the ends of said metal pieces together, means for reducing the size of said united pieces, detachable means for preventing the welded joint from being subjected to stresses and strains while it is passing between said welding means and said reducing means, and means for automatically releasing said detachable means from said welded joint prior to said joint entering said reducing means.

9. In an apparatus for reducing the size of a pair of metal pieces as a unit, means for uniting the ends of said metal pieces, means for reducing the size of said united pieces, detachable means for preventing the joint from being subjected to stresses and strains while it is passing between said uniting means and said reducing means, and means for automatically releasing said detachable means from said joint prior to said joint entering said reducing means.

10. In a clamping device for reinforcing the welded joint between the ends of two wire coils prior to reducing both of said coils as a unit, a pair of upper and lower grooved jaws for engaging said joint and adapted to be detachably connected therewith, and interlocking wedging means on said jaws adapted to permit automatic separation of said jaws by engagement with a stop bar located in front of a reducing apparatus.

11. In a clamping device for reinforcing the welded joint between the ends of two wire coils prior to wiredrawing both of said coils as a unit, a pair of upper and lower grooved jaws for engaging said joint and adapted to be detachably connected therewith, and interlocking wedging means on said jaws adapted to permit automatic separation of said jaws by engagement with an abutment located in front of a wiredrawing apparatus.

12. In a clamping device for reinforcing the welded joint between the ends of two wire coils prior to wiredrawing both of said coils as a unit, a pair of upper and lower jaws for engaging said joint and adapted to be detachably connected therewith, and interlocking wedging means on said jaws adapted to permit automatic separation of said jaws by engagement with an abutment located in front of a wiredrawing apparatus.

13. In a clamping device for reinforcing the welded joint between the ends of two wire coils prior to wiredrawing both of said coils as a unit, a pair of upper and lower grooved jaws for engaging said joint and adapted to be detachably connected therewith, and interlocking wedging means on said jaws adapted to permit automatic separation of said jaws by engagement with an abutment located in front of a wiredrawing apparatus, said jaws having overlapping ends.

14. In a clamping device for reinforcing the welded joint between the ends of two wire coils prior to wiredrawing both of said coils as a unit, a pair of upper and lower grooved jaws for engaging said joint and adapted to be detachably connected therewith, and interlocking wedging means on said jaws adapted to permit automatic separation of said jaws by engagement with an abutment located in front of a wiredrawing apparatus, said jaws having overlapping rounded ends.

15. In a clamping device for reinforcing the welded joint between the ends of two zinc wire coils prior to wiredrawing both of said coils as a unit, a pair of upper and lower grooved jaws for engaging said joint and adapted to be detachably connected therewith, and interlocking wedging pin and slot means on said jaws adapted to permit automatic separation of said jaws by engagement with an abutment located in front of a wiredrawing apparatus.

16. In an apparatus for producing a continuous wire, means for pressing together a pair of wires having frusto-conical ends, means for passing electric current through said contacting ends until a fused welded joint having an extruded fin is produced, means for removing said fin, means attached to said joint for reinforcing it from breaking stresses and strains while the wire is being uncoiled, and means for passing said wire through a reducing apparatus.

17. The process of producing a continuous pair of wire coils in a unit with but one pass through a reducing apparatus, forming a welded joint at the ends of said coils, reinforcing said joint by clamping means attached to said coils, straightening the ends of said coils, removing said clamping means, and passing said wire through reducing rolls.

18. The process of producing a continuous pair of wire coils as a unit with but one pass through a reducing apparatus, which comprises forming a welded joint at the ends of said coils, reinforcing said joint by clamping means attached to said coils, straightening the ends of said coils, removing said clamping means, and then immediately passing said wire through a reducing apparatus.

19. In an apparatus for reducing the size of a pair of metal pieces as a unit, means for welding the ends of said metal pieces together, means for reducing the size of said metal pieces, means detachably connected to the welded joint for preventing it from flexing between the time it leaves the welding means and enters said reducing means, and means for releasing said flexing-preventing means just before said joint enters said reducing means.

20. In an apparatus for producing a continuous zinc wire, means for uniting the ends of a pair of zinc wire coils, passing electric current through said contacting ends until a fused welded joint is produced, means detachably connected to said joint for reinforcing said welded joint from breaking stresses and strains while the wire is being uncoiled, means for automatically releasing said reinforcing means at a predetermined time in the processing of said welded joint, and means for reducing the diameter of said wire.

LEAMAN S. HARVEY.
HOWARD P. HART.